United States Patent
Kubo et al.

(10) Patent No.: US 6,267,678 B1
(45) Date of Patent: Jul. 31, 2001

(54) METHOD OF CARRYING OUT COMMUNICATION BETWEEN DIFFERENT GAME DEVICES, A GAME SYSTEM PLAYED BY USING THE METHOD, AND A RECORDING MEDIUM USED IN THE GAME SYSTEM

(75) Inventors: Morikuni Kubo; Tsutomu Watanabe, both of Tokyo (JP)

(73) Assignee: Konami Corporation, Tokyo (JP)

(*) Notice: Subject to any disclaimer, the term of this patent is extended or adjusted under 35 U.S.C. 154(b) by 0 days.

(21) Appl. No.: 09/653,208

(22) Filed: Aug. 31, 2000

(30) Foreign Application Priority Data

Aug. 31, 1999 (JP) .................................................. 11-246382

(51) Int. Cl.[7] ..................................................... A63F 13/12
(52) U.S. Cl. .................................. 463/44; 463/40; 463/11
(58) Field of Search .................................. 463/43, 44, 42, 463/41, 40, 9, 10, 11; 273/148 B

(56) References Cited

U.S. PATENT DOCUMENTS

| | | | |
|---|---|---|---|
| 4,858,930 | * | 8/1989 | Sato . |
| 5,184,830 | * | 2/1993 | Okada . |
| 5,397,133 | | 3/1995 | Penzias ................... 273/439 |
| 5,428,528 | * | 6/1995 | Tabenouchi et al. . |
| 5,662,332 | | 9/1997 | Garfield ................... 273/308 |
| 5,743,801 | * | 4/1998 | Welander . |
| 5,759,100 | * | 6/1998 | Nakanishi . |
| 5,785,598 | * | 7/1998 | Hsu . |
| 5,809,520 | * | 9/1998 | Edwards et al. . |
| 5,941,775 | * | 8/1999 | Nafea et al. . |
| 6,007,428 | * | 12/1999 | Nishiumi et al. . |
| 6,132,315 | * | 10/2000 | Miyamoto et al. . |

FOREIGN PATENT DOCUMENTS

| | | |
|---|---|---|
| 0933724A1 | 8/1999 | (EP) . |
| 0938919A2 | 9/1999 | (EP) . |
| 2-210562 | 8/1990 | (JP) . |
| 157744 | 6/2000 | (JP) . |

OTHER PUBLICATIONS

Craig Harris; "Pocketstation"; Mar. 10, 1999; pp. 1–3.
"SCE Develops Miniature Personal Digital Assistant"; Feb. 19, 1998; the whole document.

* cited by examiner

*Primary Examiner*—Michael O'Neill
(74) *Attorney, Agent, or Firm*—Sughrue, Mion, Zinn, Macpeak & Seas, PLLC

(57) ABSTRACT

In a game system comprising a plurality of game machines that are different in structure from each other and that have wireless communication functions, a game can be enjoyed by the different game machines under a common playing environment using the same items. To this end, only element information related to the game executed by one game machine is transferred to another game machine in the form of a wireless signal or an infrared ray signal. The element information is representative of the items and is converted by another game machine into images representative of items corresponding to the element information. The game may be, for example, a card game which has a wide variety of cards numbered and identified by card numbers assigned thereto. The element information may include the card numbers.

23 Claims, 12 Drawing Sheets

METHOD OF CARRYING OUT COMMUNICATION BETWEEN DIFFERENT GAME DEVICES, A GAME SYSTEM PLAYED BY USING THE METHOD, AND A RECORDING MEDIUM USED IN THE GAME SYSTEM

BACKGROUND OF THE INVENTION

The present invention relates to a game system structured by different types of game machine devices and a communication method and a transmission method used in the game system. In particular, the present invention relates to the game system that is capable of playing and enjoying a card game.

Recently, a wide variety of home video game machines (will be referred to as main game machine unit) have been proposed and widely sold in the market. As a result, have been developed and sold various kinds of computer-readable recording media, such as cassettes, CD-ROMs, or the like that correspond to each of the main game machine unit.

Differing from the main game machine unit, many video game devices of portable types have been also proposed and on sale and may be called portable game devices hereinafter. Each of the portable game devices can be carried or borne and can enjoy a game anywhere. In addition, many of such portable game devices can be connected to a home television set and can play a game on the television set. Among the portable game devices, there is a portable game device that has a communication function and that is therefore communicable with another portable game device of the same type by the use of an infrared ray. As a result, the portable game device of this type can enjoy the same game among a plurality of players and may be called a portable game machine so as to be distinguished from the other portable game devices that have no communication function.

Alternatively, a game device of a memory card type has been proposed and sold and will be referred to as a memory card device hereinafter. Such a memory card device is attachable to and detachable from a main game machine unit, namely, a main body of the main game machine unit and can be downloaded with a program from the main body. The memory card device can also enjoy a game in accordance with the downloaded program with the memory card device detached from the main body and can be therefore used as a kind of a portable game device. Such a memory card device is also communicable with another memory card device by the use of an infrared ray.

In the meanwhile, it is to be noted that the instant inventors have previously proposed a card game which can be enjoyed by the use of the above-mentioned portable game machine. Such a card game includes various sorts of cards having different abilities (or ability indexes) and functions and assigns a predetermined life points to each player. With this card game, a selected card is selected among the cards by each player and is located or put in a predetermined playing field on a screen of the portable game machine to be compared with another card located by another player(may be, for example, a computer in the portable game machine). Under the circumstances, decision is made about wins and losses in the card game by comparing the abilities of the cards located on the predetermined field.

The above-mentioned card game is progressive and advanced by alternately locating the cards in the predetermined field and is continued until the life point of either one of the players becomes equal to zero. This card game can be enjoyed not only by a single player but also among a plurality of players by communicating with the other portable game machine or machines by the infrared ray, as mentioned in connection with the portable game machine.

More specifically, the card game previously proposed by the instant inventors prepares seven hundreds sorts of the cards, each sort composed of 250 cards, and the resultant total of 175000 cards. Among them, three hundreds (300) cards are accommodated into a storage portion that is called in the card game "briefcase". At the beginning of the card game, forty cards are selected or derived from the "briefcase" to form a pile of cards which is called "deck". Practically, the card game is played by the use of the forty cards included in the deck.

Furthermore, the instant inventors have also proposed a card game system in Japanese Patent Application No. H11-209582, namely, 209582/1999. Specifically, the card game system is applicable to the home video game machine (namely, the main game machine unit) to which the memory card device is attached. This card game system can enjoy the card game like in the portable game machine mentioned above and can induce an additional interest in comparison with the card game played by the portable game machine, by utilizing the main body and the memory card device.

Herein, it is to be noted that most of the cards in the card game played by the use of the card game system are identical with those in the card game played by the use of the portable game machine.

However, card game programs for the card games are peculiar to the portable game machine and the card game system and are neither interchangeable from each other nor compatible with each other. This applies to any other game programs.

In addition, proposal has been made about exchanging cards among players by using the communication function installed in the portable game machines of the same type. However, results and records accomplished by the portable game machine mentioned above can not be utilized by the card game system or apparatus in spite of the fact that the cards themselves are common to the card games executed by the portable game machine and the card game system.

More particularly, let a specific card be obtained by the use of the portable game machine by accomplishing a predefined condition determined in the card game. In this event, the specific card is not available to the card game system with the memory card device as long as the predefined condition is not cleared by the use of the card game system. Accordingly, each player must clear the same predefined condition by the card game system also to get the specific card.

At any rate, even when the card game played by the portable game machine is similar to that played by the card game system, the card games can not be enjoyed by the use of the same cards in the portable game machine and the card game system. This is not restricted to the card game but applies to any other games.

For example, it is assumed that a certain player clears the predefined condition with the portable game machine. When the player plays the card game by the use of the card game system, the player should repeat the same card game many times by the card game system also to clear the predefined condition. Otherwise, the specific card can not be obtained and the card game can not be enjoyed by the use of the same cards in the card game system. Repeating the same card game many times to clear the predefined condition is boring for each player. This might lose player's interest.

SUMMARY OF THE INVENTION

It is an object of the present invention to provide a communication method of communicating between game machines that are different in structure from each other.

It is another object of the present invention to provide a communication method of the type described, which can enjoy a common card game in both a portable game machine and a main game machine unit having a memory card device.

It is still another object of the present invention to provide a method of the type described, which is capable of transmitting information from the portable game machine to the memory card device to enjoy the same card game by using the same cards.

It is yet another object of the present invention to provide a communication method of the type described, wherein the main game machine unit is capable of using the cards transmitted from the portable game machine.

It is an object of the present invention to provide a computer-readable recording medium which stores a program for establishing the above-mentioned method.

It is still another object of the present invention to provide a game system which is capable of executing a card game by using the card transmitted and received in accordance with the method mentioned above.

It is yet another object of the present invention to provide an information transfer method of transferring element information from a memory card device to a main body to visually display a desired card corresponding to the element information.

A communication method to which the present invention is applicable si for use in a game system which comprises a memory card device and a portable game machine different in structure from the memory card device.

The memory card device has a communication function and is attachable to and detachable from a main game machine unit and loaded with a device program related to a predetermined game from the main game machine unit. The portable game machine is loaded with a cassette which stores a game program related to the predetermined game and is communicable with the memory card device. According to an aspect of the present invention, the method comprises the steps of transmitting, from the portable game machine to the memory card device, element information concerned with elements used in the predetermined game, and receiving and visually displaying the element information in the memory card device. The predetermined game is specified by a card game played by the use of a plurality of cards while the element information carries card numbers of the cards to identify each card. The communication between the memory card device and the portable game machine is carried out by the use of an infrared ray based on the IrDA.

The method further comprises the steps of transferring the element information from the memory card device to the main game machine unit, when the memory card device is attached to the main game machine unit and executing the predetermined game in the main game machine unit on the basis of the element information transferred from the memory card device.

According to another aspect of the present invention, a game system comprises a memory card device attachable to a main game machine unit and a game machine different in structure from the memory card device. The game machine comprises means for displaying, on a display unit of the game machine, a transmission mode for transmitting element information related to elements used in a predetermined game and means for transmitting the element information when the transmission mode is selected. The memory card device comprises means for putting the memory card device into a reception mode for receiving the element information and means for visually displaying the element information in the reception mode in response to the element information.

A computer-readable recording medium according to still another aspect of the present invention is for use in a portable game machine which has a communication function by a wireless signal. The computer-readable recording medium stores a program which executes a game. The program comprises the steps of preparing items which are used in the game and which are identified by item numbers assigned to the respective items and item images, selecting the item numbers alone without the item images, and transmitting element information carrying the selected item numbers. The game may be a card game which uses a plurality of cards identified by card numbers. In this event, the element information carries the card numbers as the item numbers.

A computer-readable storage medium according to yet another aspect of the present invention is for use in a memory card device communicable with the portable game machine which has the computer-readable recording medium mentioned above. The storage medium stores a program which comprises the steps of receiving the element information carrying the item number and displaying the item number on the memory card device. The program may further comprise the steps of transferring the element information to a main game machine unit when the memory card device and displaying images corresponding to the element information by the use of the main game machine unit.

DESCRIPTION OF THE PREFERRED EMBODIMENTS

For a better understanding of the present invention, description will be made about a game system to which the present invention is applicable.

Figure 1:
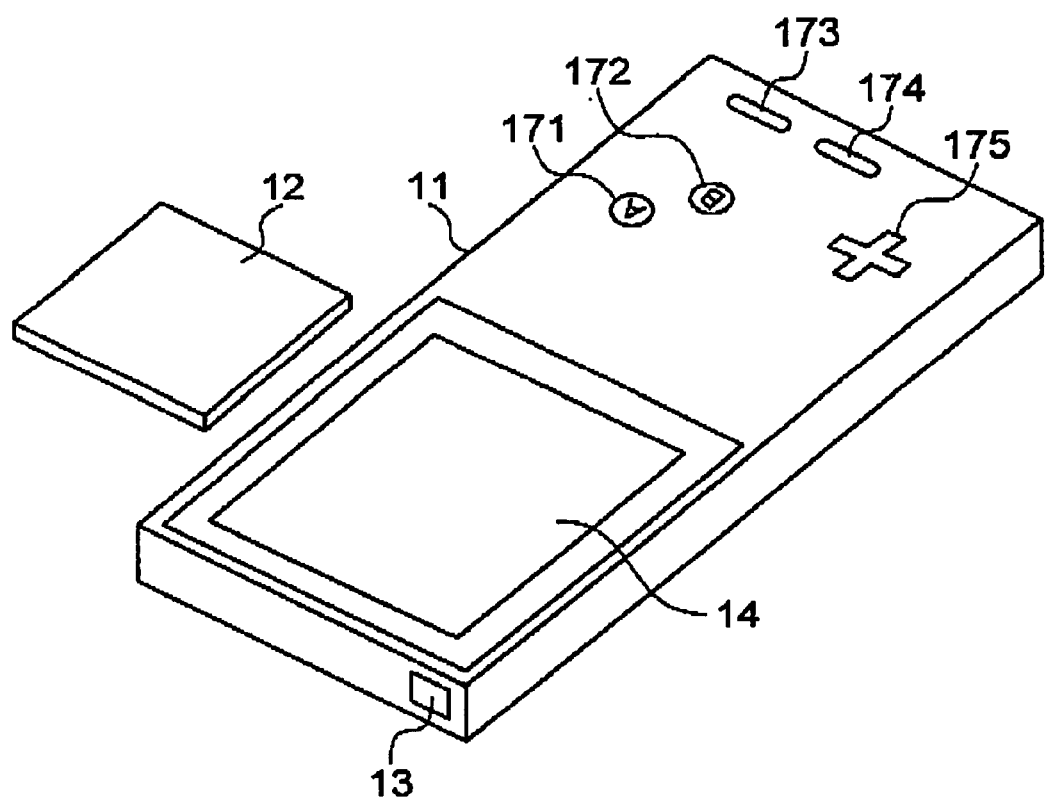
FIG. 1 shows a perspective view for use in describing a game system according to the present invention, which has a portable game machine and a memory card device detached from a main game machine unit (a game machine main body)
Figure 1:
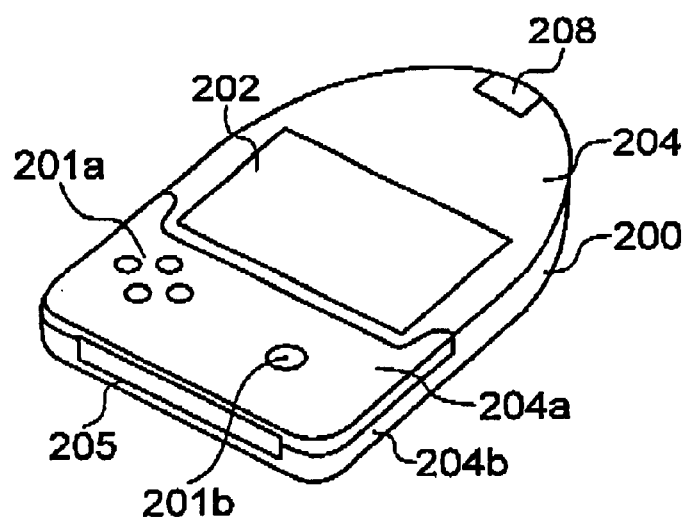

Referring to FIG. 1, a game system according to an embodiment of the present invention has a portable game machine 11 and a memory card device 200 attachable to or detachable from a main game machine unit (not shown in this figure). The illustrated portable game machine 11 has a machine-side communication portion 13 which is shown on a lower side of FIG. 1 and which carries out communication by the use of an infrared ray. As well known in the art, the portable game machine 11 further has a liquid crystal display (LCD) panel 14, A and B buttons 171 and 172, a start button 173, a select button 174, a cross-shaped key 175. In the illustrated example, the portable game machine 11 is assumed to be loaded with a cassette 12 which stores a card game program similar to that described in Japanese Unexamined Patent Publication (JP-A) No. 2000-157744.

On the other hand, the memory card device 200 also has a card-side communication portion 208 which carries out communication by the use of the infrared ray. Moreover, the illustrated memory card device 200 has a LCD 202, a button group 201a, and a decision button 201b. The button group 201a is composed of four buttons used for upward, downward, rightward, and leftward movement while the decision button 201b is operable to input a numeral or the like and to decide it. In addition, the memory card device 200 is downloaded from the main game machine unit with a part of a program. It is surmised that the program part serves to receive element information related to a card game in a manner to be described later in detail.

As shown in FIG. 1, the memory card device 200 has a package structured by an upper shell 204a and a lower shell 204b and a connector window 205 which is shown on the lower side of FIG. 1. The connector window 205 is used to connect or to disconnect the memory card device 200 to or from the main game machine unit. In other words, the illustrated memory card device 200 is attached to the main game machine unit through the connector window 205. On attaching the memory card device 200 to the main game machine unit, the upper shell 201a is opened upwards of FIG. 1. Within the package of the memory card device 200, provided substrate for mounting a memory unit, a microcomputer, and the like, along with power source terminals and connection terminals for signals.

In the interim, the illustrated portable game machine 11 has two communication functions each of which uses the infrared ray. In other words, the portable game machine can selectively carry out communication by the use of the infrared ray in first and second modes different from each other. Practically, the first mode may be called a remote control mode while the second mode is for carrying out data communication defined by the IrDA.

On the other hand, it is assumed that the illustrated memory card device 200 has the communication function defined by the IrDA.

Under the circumstances, it is understood that communication can be carried out by the use of the infrared ray between the portable game machine 11 and the memory card device 200, when the communication function defined by the IrDA is selected by both the portable game machine 11 and the memory card device 200. Herein, data bits are sequentially transmitted by the infrared ray and are received in the infrared ray communication defined by the IrDA. On a receiving side, the data bits are successively counted in the IrDA standard.

Taking the above into consideration, description will be made about the operation illustrated in FIG. 1. At first, it is presumed that both the portable game machine 11 and the memory card device 200 are set into states such that they are operable in accordance with programs concerned with card games, respectively.

Under the circumstances, it is assumed that a player clears a predetermined campaign mode by using the portable game machine 11.

Figures 2, 3:
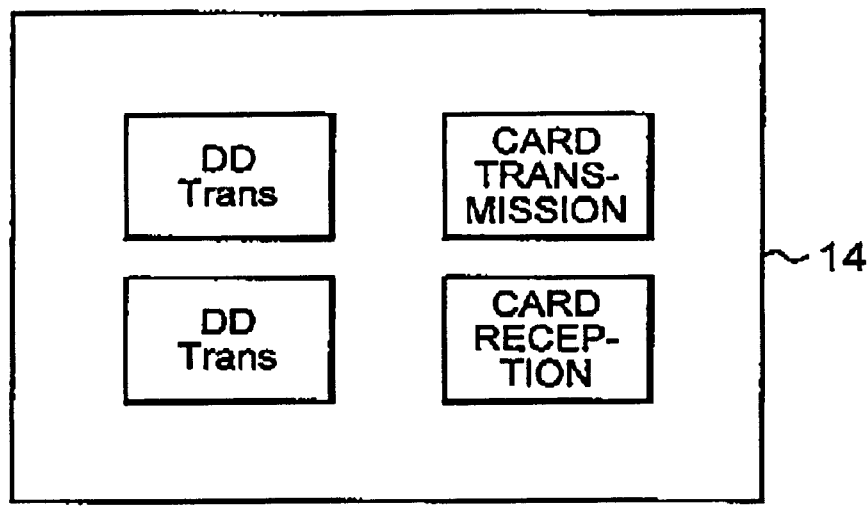
FIG. 2 exemplifies a screen image which is visually displayed on the portable game machine illustrated in FIG. 1.
FIG. 3 shows a reception image displayed on the memory card device illustrated in FIG. 1.

In this event, a menu image as shown in FIG. 2 is visually displayed on the LCD unit 14 of the portable game machine 11 so as to carry out the communication. Although description has been made on the assumption that the menu image appears on clearing the predetermined campaign mode, such a menu image may be also displayed on the LCD unit 14 when the deck of the cards formed in the portable game machine 11 becomes empty. In this case, the portable game machine 11 is put into a reception state of receiving a card from the memory card device 200. The resultant card is stored in the deck.

In FIG. 2, "card transmission" and "card reception" are representative of commands selected on transmitting and receiving cards by the infrared ray, respectively, while "DD trans" represents commands selected on transmitting and receiving cards without using any infrared ray. The "card transmission" command indicates a transmission mode by using an infrared ray based on the IrDA standard, as will become clear.

On transmission, the memory card device 200 shown in FIG. 1 is at first put into the state of receiving the data sequence sent by the infrared ray. In this state, let the machine-side communication portion 13 be opposed to the card-side communication portion 208. Next, the "card transmission" command of the portable game machine 11 is selected on the menu image (FIG. 2) by a player. Under the circumstances, element information related to the cards stored in the deck is transmitted in the form of the infrared ray data from the portable game machine 11 to the memory card device 200. The infrared ray data is received by the card-side communication portion 208 of the memory card device 200.

Herein, it is to be noted that card numbers are assigned to cards used in the card game executed in the portable game machine 11 and are used in common to those of cards used in the main game machine unit to which the memory card device 200 is attached. In addition, the cards used in the card game of the portable game machine 11 are equal in number to those used in the card game of the main game machine unit or the game machine apparatus.

Furthermore, the portable game machine 11 includes a data storage RAM of a memory capacity of about 8 Kb together with a display RAM while the memory card device 200 includes an SRAM of a memory capacity of 2 Kb or so. By using the SRAM, the memory card device 200 can display a monochrome image of 32 dots by 32 dots on the LCD 202.

Taking the above into account, it is difficult to transmit all image data related to the cards from the portable game machine 11 to the memory card device 200 and to display the image on the LCD 202 of the memory card device 200.

Taking into account a difference of the memory capacities between the portable game machine 11 and the memory card device 200, the present invention now proposes transmitting, from the portable game machine 11 to the memory card device 200, only element information except image and attribute information of cards in accordance with the IrDA standard. In this event, the element information is indicative of species and the numbers of the cards transmitted from the portable game machine 11 to the memory card device 200. Such element information is repeatedly transmitted as the infrared ray signal from the portable game machine 11 a plurality of times. When the element information can not be received, an error is displayed on the LCD 202 of the memory card device 200. The above-mentioned infrared ray communication is executed by separating or spacing the portable game device 11 and the memory card device 200 about several tens of centimeters, preferably, about ten centimeters apart.

Supplied with the element information, the memory card device 200 displays an image as exemplified in FIG. 3 on the LCD 202. In the illustrated example, cards that are given card numbers "002", "004", and "006" are received by the memory card device 200 by one, two, and one pieces or sheets of cards, respectively. Likewise, forty cards in the deck formed in the portable game machine 11 are all displayed on the LCD 202 of the memory card device 200.

The forty cards thus received by the memory card device 200 are transferred to the game machine apparatus or the main game machine unit when the memory card device 200 is attached through the connector window 205 to the main game machine unit. As a result, card images, which correspond to the element information, are displayed on a home television set under control of the main game machine unit. In other words, the element information related to the cards and received by the memory card device 200 is converted into the corresponding card images by the main game machine unit to be visually displayed on the home television set. In this case, the attributes of the cards received through the memory card device 200 are also regenerated with reference to the card numbers within the main game machine unit.

According to this structure, the player who plays the card game by using the portable game machine 11 can continue the card game by using the game machine apparatus with the memory card device 200, on the condition that the same cards of the player used in the portable game machine 11 are kept intact with the same card environment maintained in the game machine apparatus.

In order to facilitate understanding of the present invention, description will be made about the portable game machine 11 and the game machine apparatus including the memory card device 200.

Figure 4:
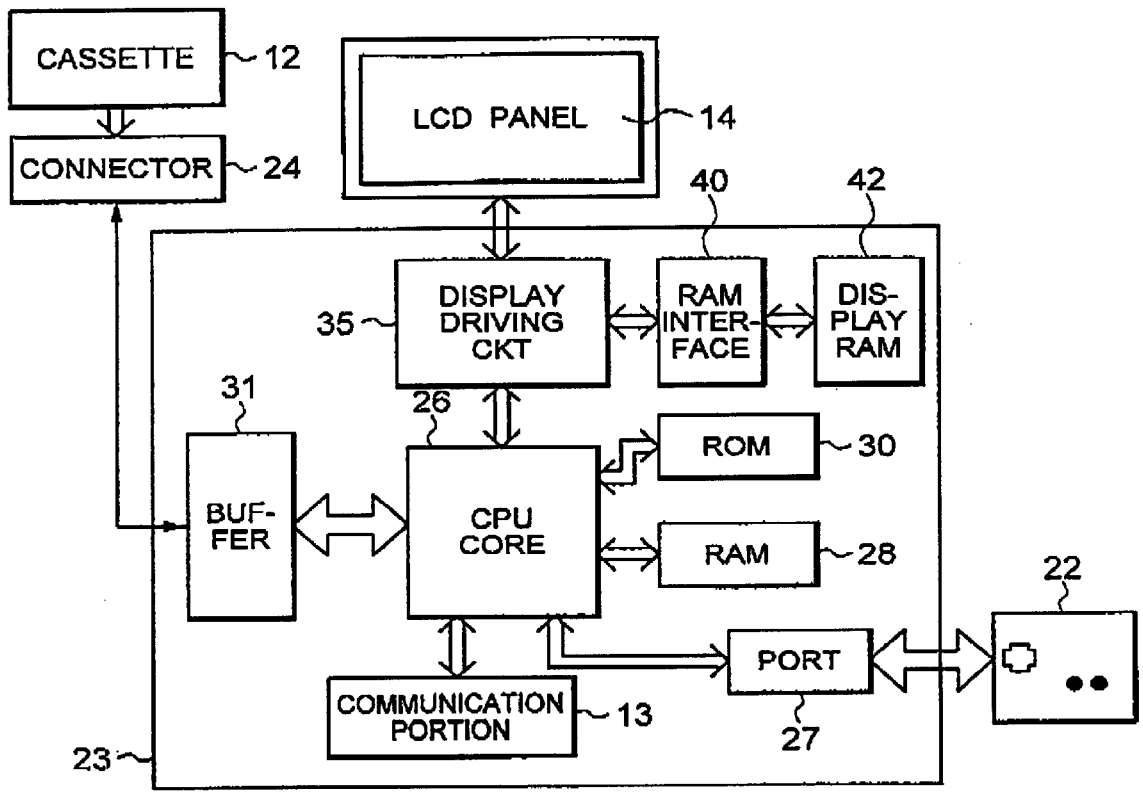
FIG. 4 is a block diagram for use in describing an inside structure of the portable game machine illustrated in FIG. 1.
Figure 5:
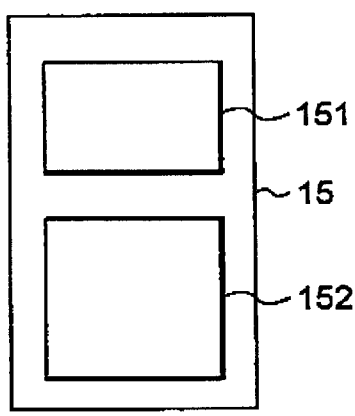
FIG. 5 is a conceptual view of a cassette attached or loaded into the portable game machine illustrated in FIG. 1.

Referring to FIGS. 4 and 5, the portable game machine 11 illustrated in FIG. 1 will be described in detail. At first, a computer-readable recording medium 15 illustrated in FIG. 5 is included or inherent in the cassette 15 and is structured by a ROM (Read Only Memory) formed by a semiconductor memory. As shown in FIG. 5, the recording medium 15 has an instruction area 151 storing a sequence of instructions for the card game program and a data area 152 storing various data signals necessary for the card game.

The portable game machine 11 is described, for example, in Japanese Unexamined Patent Publication (JP-A) No. H02-210562, namely 210562/1990 and has the LCD panel 14, a controller panel 22, and a CPU main game machine unit 23. On the controller panel 22, arranged is the A and B buttons 171 and 172, the start button 173, the select button 174, and the cross-shaped key 175 mentioned in conjunction with FIG. 1. In the illustrated example, the cassette 12 that stores the card game program is inserted through a connector 24 to the CPU main game machine unit 23.

The CPU main unit 23 comprises a CPU core 26, a port 27 provided between the CPU core 26 and the controller panel 22, a RAM 28 connected to the CPU core 26, and a ROM 30 connected to the CPU core 26. Moreover, the CPU core 26 is also connected to a buffer 31 for timing, addresses and data, and to the connector 24 via a bus. A display driving circuit 35 is provided between the CPU core 26 and the LCD panel 14. A display RAM 42 storing characters to be displayed on the LCD panel 14 is connected to the display driving circuit 35 via a display RAM interface 40.

In addition, the illustrated portable game machine 11 includes, as a communication control interface, the machine-side communication portion 13 connected to the CPU core 26 to carry out communication by the use of an infrared ray. With this structure, the portable game machine 11 is communicable through the machine-side communication portion 13 with the memory card device 200 by the infrared ray.

The ROM 30 stores an operating system (OS) for controlling the LCD panel 14, the display driving circuit 35, the machine-side communication portion 13, and the like.

Now, let the cassette 12 storing the card game relating to the present invention be connected to the CPU core 26 of the illustrated portable game machine 11 through the connector 24. In this event, when the portable game machine is turned on or reset, then the CPU core 26 starts up the OS stored in the ROM 30. As a result, the portable game machine 11 is wholly initialized to read out the card game program stored on the recording medium 15 contained in the cassette 12. Thereafter, the card game program is transferred to both the display RAM 42 and the RAM 28 operable as a main memory. Under the circumstances, the CPU core 26 executes the aforementioned card game program in accordance with operations made by the player by the use of the controller panel 22. Thus, a necessary image is displayed in response to the display data on the LCD panel 14.

Practically, the display RAM 42 is accessed through the display RAM interface 40 in response to the instructions given by the player. In response to the display data, character and card images are read out of the display RAM 42 to be displayed on the LCD panel 14 through the display driving circuit 35.

In the illustrated portable game machine 11, the element information that is related to the forty cards contained in the deck is sent from the portable game device 11 to the memory card device 200. Herein, it is to be noted that the element information is transmitted by the infrared ray, namely, through a wireless channel and that the portable game machine 11 is different in structure from the memory card device 200.

Proposals have been already made about exchanging the cards between the portable game machines 11 through a cable. However, no game system has been realized yet such that transmission is made by using the infrared ray to transmit the element information related to the forty cards between different game machines.

It is assumed that the illustrated portable game machine 11 executes the card game in a manner to be mentioned below.

At first, the card game is progressive by alternately locating each card on a predetermined playing field defined on the screen of the LCD panel 14. As the cards used in the card game, prepared are 700 species of the cards from which the predeternined number of cards, namely, forty cards are selected and entered into the deck. The card game lasts until the life point of either one of the players becomes zero by locating the cards on the playing field and by indicating attack or defense at each card. When the life point becomes zero, the player loses the card game and become a loser. The loser must give one of the cards to a winner.

The cards used in the card game are classified into monster cards, magic cards, and field cards. Among them, the monster cards have attack and defense ability indexes predetermined for the respective monster cards while the magic cards demonstrate special effects determined for them when they are put on the playing field. The field cards serve to define battle or competition environments in the playing field and include forest cards representative of a forest, wilderness cards representative of a wilderness, mountain cards representative of a mountain, grassland cards representative of a grassland, sea cards representative of a sea, and darkness cards representative of a darkness.

The attack and the defense ability indexes of the monster cards are varied in each battle field, depending on each of the field cards put on the screen. Therefore, strength and weakness of each monster card can not be uniquely decided. This makes it difficult to simply decide a winner or a loser and attracts player's interest. Furthermore, the cards may be divided into a plurality of groups which have predefined relationships related to strength and weakness so as to heighten players' interest.

The magic cards are used for arousing the predetermined special effects to the monster cards put on the playing field. For example, there is a black hole card as one of the magic cards. When such a black hole card is put on the screen, all cards arranged on the playing field are removed from the playing field and disappear from the screen of the LCD panel 14. In addition, the magic cards may include a reinforcement card for reinforcing a prescribed card by combining the reinforcement card with the prescribed card and a trap card for automatically demonstrating a predetermined special effect when cards put by an opponent satisfy a determined condition.

Thus, preparing wide variety of cards as mentioned above is helpful to make the card game very fun and thrilling. In this case, if a plurality of cards can be put on the playing field within a single turn, the card game becomes more strategical because outcomes resulting from a card put beforehand can be utilized also.

Herein, attention must be paid to the fact that all players can not always utilize all the cards of 700 species. In other words, the present invention prepares particular ones of the cards that can be obtained only when the specific condition is fulfilled. Such provision of the particular cards serves to attract players' interest because players must consider whether or not the specific condition is fulfilled. In this event, players' interest might be directed to collecting the cards.

As mentioned before, the card game according to the present invention uses the cards of 700 species that are expressed by images different from one another. This means that a great amount of image information is needed to wholly transmit image information related to all cards. Therefore, it is practically difficult to transmit whole image information from the portable game machine 11 to the memory card device 200 by the use of the infrared ray. In addition, the memory card device must have a very large memory capacity so as to store a great amount of information. Such a memory card device is not practical.

Taking the above into consideration, the present invention transfers only the card numbers and the sheet numbers between the portable game machine 11 and the memory card device 200.

Next, description will be directed to the card game executed by the game machine apparatus composed of the memory card device 200 and the main game machine unit and, thereather, to the structure of the memory card device 200.

Figure 6:
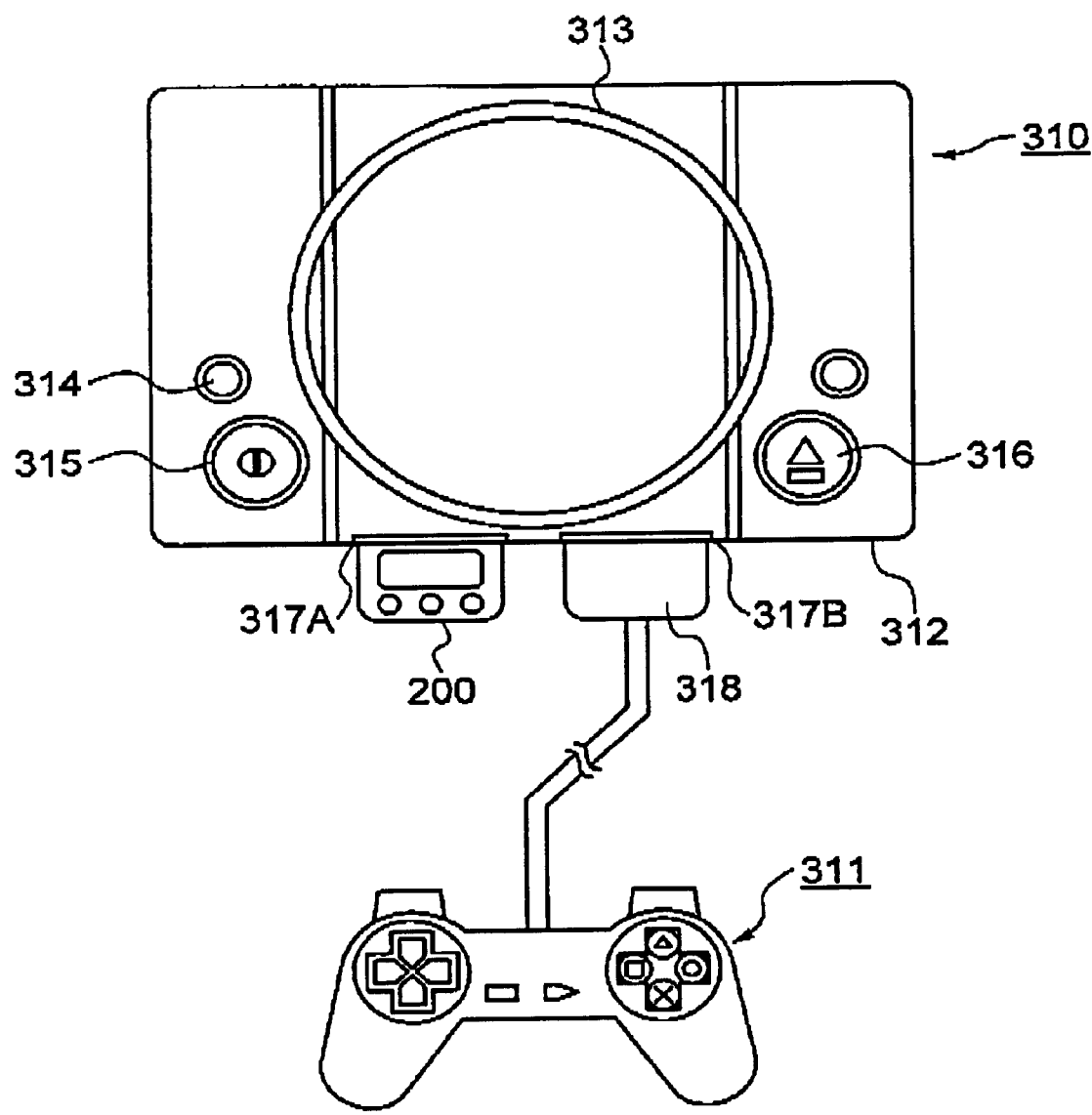
FIG. 6 shows a plan view of the main game machine unit (the game machine main body) to which the memory card device is attached.
Figure 7:
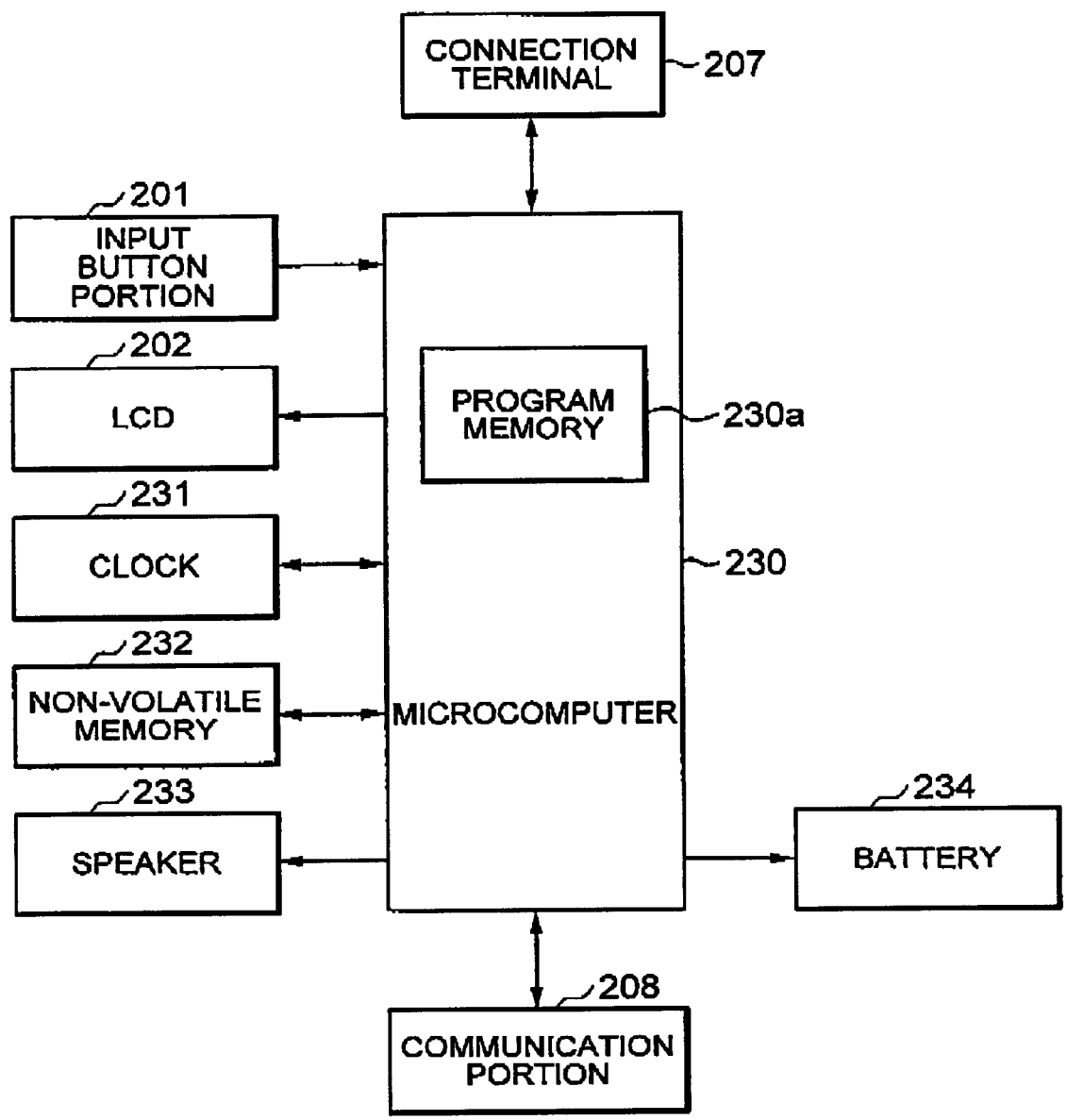
FIG. 7 shows a block diagram of the memory card device illustrated in FIG. 1.

Referring to FIG. 6, the illustrated game machine apparatus according to the present invention is structured by the main game machine unit (depicted by 310), the memory card device 200 attached to the main game machine unit 310, and a controller 311. On playing a usual video game, the main game machine unit 310 is connected to a home television set (not shown) and a player enjoys the video game by operating the controller 311, watching the screen of the home television set.

Specifically, the main game machine unit 310 comprises a housing 312 of a substantially rectangular shape, and a disk loading or mounting unit 313 in the center on the top surface of the housing 312. The disk mounting unit 313 can be opened and closed. In the illustrated home game machine, an optical disk (not shown) is loaded into the disk loading unit 313 and may be operable as a recording medium configured by a CD-ROM which stores a video game application program.

On the upper surface of the housing 312 configuring the main game machine unit 310 are also provided a reset switch 314 for resetting the video game by the operation of a player, a power switch 315, and a disk operating switch 316. The disk loading unit 313 is opened and closed by operating the disk operating switch 316 so that an optical disk can be attached or ejected. On the front side of the housing 312 are provided two slots, 317A and 317B for accommodating memory cards or the like in the illustrated example, the controller 311 is connected to the main game machine unit 310 through a connection terminal unit 318 within the slot 17B.

The memory card device 200 illustrated here comprises a microcomputer 30 forming a control section, and a program memory 30a is provided inside this microcomputer 30. The microcomputer 30 is connected to the input button switches 201, the liquid crystal display (LCD) 202, the connection terminal 207 and the wireless communication portion 208. Furthermore, a clock 231, a non-volatile memory 232, a speaker 233 and a battery 234 are connected to the microcomputer 30. Among them, the non-volatile memory 232 is constituted by a semiconductor memory, such as a flash memory, which does not lose the data stored thereon when the power supply is disconnected. Moreover, since the memory card device 200 has its own battery 234 in this way, it is also possible to use a static random access memory (SRAM) as a non-volatile memory 232.

Since the memory card device 200 relating to the present invention is provided with the program memory 30a as described above, it is possible to change or execute an application program in the memory card device 200 itself, by downloading application software from the main game machine apparatus 310. Therefore, the memory card device 200 into which application software has been downloaded can be removed from the main game machine apparatus 310 and used as an independent portable game device.

Figure 8:
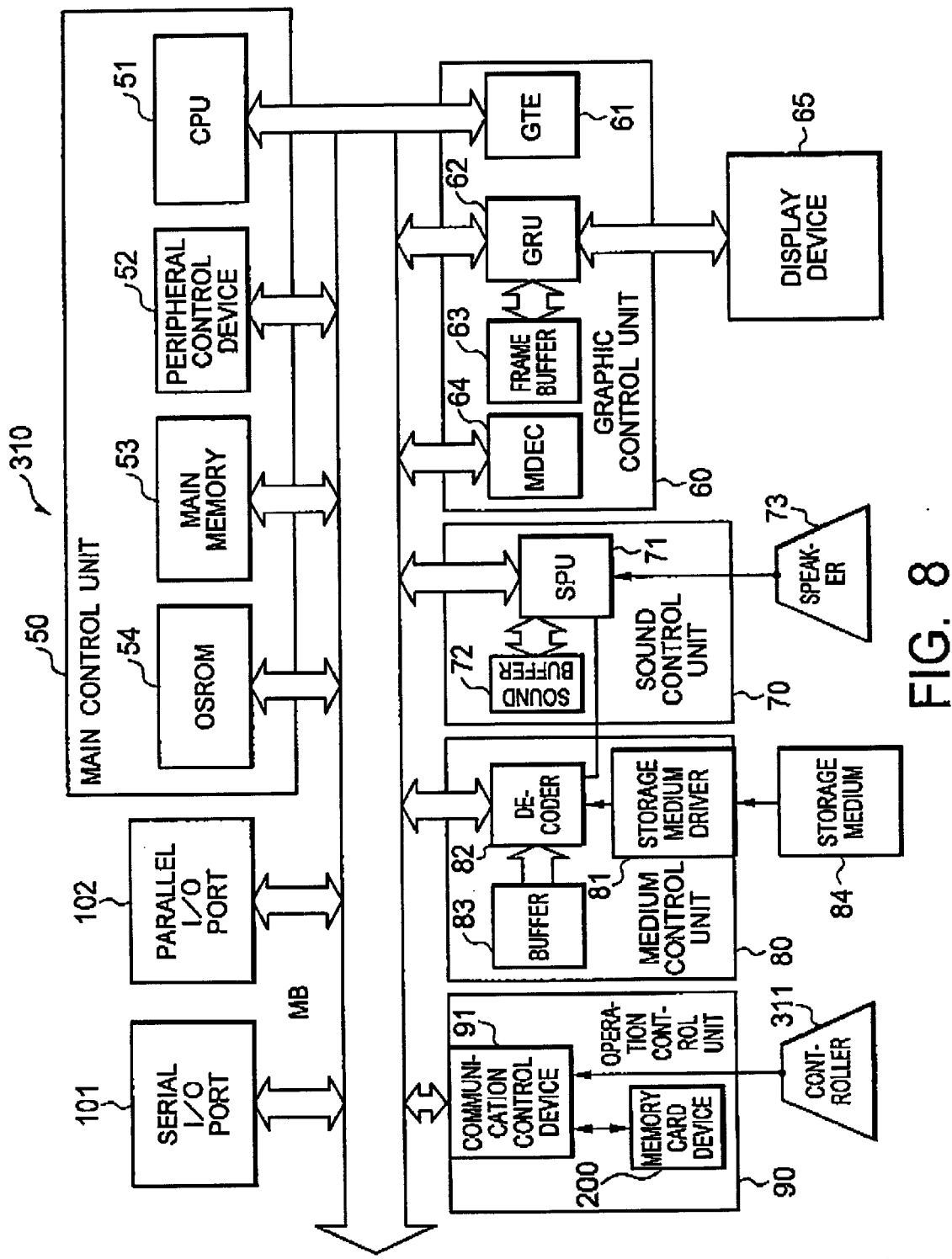
FIG. 8 shows a block diagram for use in describing the main game machine unit illustrated in FIG. 1.

Furthermore, the microcomputer 30 in the memory card device 200 used in the present invention also comprises, according to the devices connected thereto, a main unit connection interface, memory interface, display interface, input interface, sound interface, wireless communications interface, program download interface, clock management system, and the like. Referring to FIG. 8, description is made about an internal configuration of the main game machine unit 310 in which the memory card device 200 relating to the present invention is loaded.

First, a recording medium (depicted by 84) on which a program relating to the game, such as an optical disk (CD-ROM or other disk-shaped recording medium), for example, is loaded into the main game machine unit 310 to play a game. The optical disk in this embodiment is assumed to have stored thereon a program relating to the card game.

More particularly, the main game machine unit 310 comprises a main control unit 50, a graphic control unit 60, an audio control unit 70, a medium control unit 80, and a communication control unit 90, as shown in FIG. 4. These control units 50 to 90 may be collectively called the control block. The control units 50 to 90, that is, those constituting the control block, are all connected to a main bus MB. In the example shown, moreover, a parallel I/O port 101 for connecting other peripheral equipment and a serial I/O port 102 for communicating with other game apparatuses and the like are connected to the main bus MB. The main control unit 50, control input control unit 90, and medium control unit 80 operate as game control units for controlling the execution of the game in response to player control inputs in the controllers 11 that operate as control input units.

The main control unit 50 shown is configured by a central processing unit (CPU) 51, a peripheral device controller 52, a main memory 53, and an operating system (OS) ROM 54. More specifically, the peripheral device controller 52 in the main control unit 50 performs interrupt control, timing control, memory control, and control over direct memory access (DMA) transfers, etc. On the other hand, the main memory 53 is configured by an RAM of a memory capacity of 2 megabytes, for example, while the OS ROM 54 is configured by a 512-kilobyte memory, for example. The OSROM 54 stores programs for the so-called operating system or the like which manages the main memory 53, the graphic control unit 60 (operable as a graphic system), and the audio control unit 70 (operable as a sound system), etc., as mentioned before. The illustrated CPU 51 is formed by a 32-bit RISC (reduced instruction set computer) CPU and is operable to control overall devices by executing the operating system (OS) stored in the ROM 54. The illustrated CPU 51 also has a command cache and a scratch pad memory and also manages a real memory. The graphic control unit 60 is configured by a geometry transfer engine (GTE) 61, a graphic processing unit (GPU) 62, a frame buffer 63, and an expansion circuit 64. The display device 65 is connected to the GPU 62 in the graphic control unit 60. In this case, the graphic control unit 60 operates as a display control unit to control the display on the game screen in the display device 65. The display device 65 noted here may be a television receiver in the case of an ordinary home game machine, a computer display in the case of a personal computer or work station, and a game display device in the case of a commercial game machine.

The geometry transfer engine (GTE) 61 in the graphic system 60 described before is configured by a coordinate computing coprocessor that performs coordinate conversions and other processing. The graphic processing unit (GPU) 62, on the other hand, performs image drawing in accordance with drawing instructions (drawing commands) from the CPU 51. The images drawn by this GPU 62 are stored in the one-megabyte frame buffer 63, for example.

The expansion circuit 64 performs direct conversions, such as so-called discrete cosine transforms, and also is configured by an image decoder (hereinafter called an MDEC) 64 that decodes image data subjected to being compressed and encoded.

The geometry transfer engine (GTE) 61 described before comprises, for example, a parallel processing mechanism that executes a plurality of computations in parallel. The GTE 61 is operable as the coprocessor of the CPU 51 and carries out, in response to processing requests from that CPU 51, conversion, such as coordinate conversion, light source computations based on computations of the inner products of normal vectors and light source vectors. For example, fixed decimal point type matrix and vector computations can be carried out at high speed by the illustrated GTE 61.

More specifically, in cases where computations are done to implement flat shading that draws one triangular polygon in the same color, coordinate computations of around 1,500,000 polygons can be performed per second at maximum by the illustrated GTE 61. With this structure, the illustrated image processing system not only can reduce the loads on the CPU 51, but also can execute high-speed coordinate computations. It is to be noted that the polygon means a minimum graphical unit for displaying three-dimensional objects and may be a triangle or quadrangle. In the present invention, as will be described subsequently, coordinate computations are performed for each polygon using the GTE 61.

The graphic processing unit (GPU) 62 operates according to polygon drawing commands from the CPU 51, and performs the drawing of polygons for the frame buffer 63. This GPU 62 is designed to draw up to 360,000 polygons in 1 second. This GPU 62, furthermore, has its own two-dimensional address space that is independent of the CPU 51, configured so that the frame buffer 63 maps thereto.

The frame buffer 63 is formed by a so-called dual port RAM, and is capable of simultaneously performing both drawing operation indicated from the GPU 62 or transfer operation indicated from the main memory 53, and read-out operation for the displays. More specifically, the frame buffer 63 has 1 megabyte of memory capacity, for example, and is handled, respectively, as 16-bit matrixes with 1024 pixels arranged in the horizontal direction and 512 pixels arranged in the vertical direction.

This frame buffer 63 can output any display area of the stored image display areas on the display device 65. In addition to the display areas for video signals, the frame buffer 63 also comprises a CLUT area for storing a color look-up table (CLUT) that is referenced when the GPU 62 is drawing polygons and the like, and a texture area for storing materials (textures) that are inserted (mapped) into the polygons that are coordinate-converted at drawing time and drawn by the GPU 62.

The frame buffer 63 shown is also capable of performing high-speed DMA transfers with the main memory 53.

The expansion circuit (MDEC) 64 in the graphic control unit 60, meanwhile, reads data from the recording medium 84 under the control of the CPU 51, decodes still picture or moving picture image data stored in the main memory 53, and again stores those data in the main memory 53. More specifically, the MDEC 64 is designed so that it can execute reverse discrete cosine transform (reverse DCT) computations at high speed. As a result, the MDEC 64 can expand compressed data read out from the recording medium 84, according to the procedures of the color still picture compression standard (so-called JPEG) or accumulated media type moving picture encoding standard (so-called MPEG).

These reproduced image data are stored in the frame buffer 63 after being passed through the GPU 62, and thereby can be used as background for the images drawn by the GPU 62 described earlier.

The audio control unit, that is, the sound system 70, comprises a sound playback processor (SPU) 71 for generating musical sounds and sound effects, etc, based on instructions from the CPU 51, a 512-byte sound buffer 72, for example, wherein are stored voice or musical data, etc., or sound source data, etc., read out from the CD-ROM, and a speaker 73 that serves as sound output means for outputting the musical sounds and sound effects, etc., generated by the SPU 71.

The SPU 71 described above is provided with ADPCM decoding functions for reproducing audio data that have been adaptive differential encoded (ADPCM[Adaptive Differential Pulse Code Modulation]), with 16-bit audio data as 4-bit differential signals, with playback functions for playing back sound effects and the like by playing back sound source data stored in the sound buffer 72, and with modulation functions for modulating and playing back the audio data, etc., stored in the sound buffer 72.

As mentioned before, it is readily understood that the SPU 71 at issue has a built-in ADPCM sound source 24 which has functions for looping automatic modification of motion parameters having time as a coefficient, and operates according to control inputs sent from the CPU 51. The SPU 71 also manages its own address space wherein the sound buffer 72 is mapped, transfers ADPCM data from the CPU 51 to the sound buffer 72, and plays back data by directly passing key-on, key-off, and modulation information.

The sound system 70 can be used as a so-called sampling sound source that plays back musical sounds and sound effects based on audio data, etc., stored in the sound buffer 72 according to instructions from the CPU 51.

Next, the medium control unit 80 is configured by a recording medium driver 81, a decoder 82, and a buffer 83, and the recording medium 84 is loaded into the recording medium driver 81. For the recording medium 84 here, a CD-ROM, hard disk, optical disk, flexible disk, or semiconductor memory or the like can be used. In this example, the description assumes the use of an optical disk, that is, a CD-ROM. Given this relationship, it is assumed that the recording medium drive 81 is a CD-ROM driver and that the decoder 82 is a CD-ROM decoder. The card game program relating to the present invention is stored in this recording medium 84.

The recording medium driver 81 described above has functions for playing back programs and data, etc., recorded on the recording medium 84 that is a CD-ROM disk, while the decoder 82 is provided with functions for decoding programs and data, etc., that are stored after an error correction code (ECC) has been added, for example. The buffer 83, furthermore, is configured by a RAM having 32 kilobytes of recording capacity, for example, for temporarily storing playback data from the recording medium driver 81.

Provision is made here so that, in terms of disk format, CD-DA or CD-ROM XA data, etc., can be supported, and the decoder 82 also operates as a part of the audio control unit 70 for playing back audio data recorded on the recording medium 84.

The audio data recorded on the disk played back by the recording medium driver 81 shown may be, in addition to ADPCM data (CD-ROM XA ADPCM data, etc.), so-called PCM data resulting from the analog/digital conversion of audio signals.

Of the audio data noted in the foregoing, ADPCM data are recorded with the differential of 16-bit data represented with 4 bits, and those ADPCM data are supplied to the SPU 71 described earlier after being subjected to error correction and decoding by the decoder 82. The data undergoes digital/analog conversion and other processing in the SPU 71 and are then sent to the speaker 73.

Meanwhile, the audio data formed by PCM data recorded as 16-bit digital data, for example, is decoded by the decoder 82 and then used for driving the speaker 73. The audio output from that decoder 82 first goes to the SPU 71 where it is mixed with the output of that SPU, then passed through a reverb unit to form the final audio output.

The control input control unit 90 provided in the game apparatus shown in FIG. 1 comprises a communication control device 91 that controls communication with the CPU 51 via the main bus MB, and an auxiliary memory (memory card) 20. To the communication control device 91 are connected the controller 311 for inputting instructions from users, that is, from players. The auxiliary memory 20 is used here for storing game setting data and instruction input data, etc., from the controller 311.

Next, the controller 311, which are operable as an interface for transmitting the intentions of the users to the application, have multiple instruction keys, for example, for inputting instructions from the users. The states of these instruction keys are sent 60 times a second or so to the communication control device 91 by synchronous communications in accordance with instructions from the communications control device 91. The communication control device 91 thereupon transmits the states of the instruction keys of the controller 311 to the CPU 51. In the example shown, the configuration is such that the controllers 311 can be connected to the two connectors, respectively, provided in the main game machine unit 310. If multi-tap connectors are used, however, play is possible with a greater number of controllers connected to the main game machine unit 310.

Thus, by manipulating each controller 11, instructions from each player are input to the CPU 51, and the CPU 51 in the main game machine unit 310 performs processing, according to the instructions from the players, based on the game program being run.

When it is necessary to store settings for the game being run or scores at the end of a game or midway in a game in memory, the CPU 51 sends those data to be stored to the communication control device 91. Thus, the communication control device 91 stores those data from the CPU 51 in the memory card device 200. As is evident from the drawings, the memory card device 200 is separated from the main bus MB, and therefore can be loaded and unloaded while the power is turned on. Thus, it is possible to store game settings and the like in a plurality of memory card devices 200.

Now, when read out operation is carried out about programs, displaying images, or drawing images, etc., it is necessary to transfer a great amount of image data at high speed between the main memory 53, the GPU 62, the MDEC 64, and the decoder 82.

To this end, the illustrated system carries out DMA transfer by transferring data directly between the main memory 53, the GPU 62, the expansion circuit (MDEC) 64, and the decoder 82, under the control of the peripheral device controller 52. This shows that the CPU 51 is not used during the DMA transfer as described before. Thus provision is made for reducing the loads placed on the CPU 51 by data transfers, and for conducting data transfers at high speed.

Figure 9:
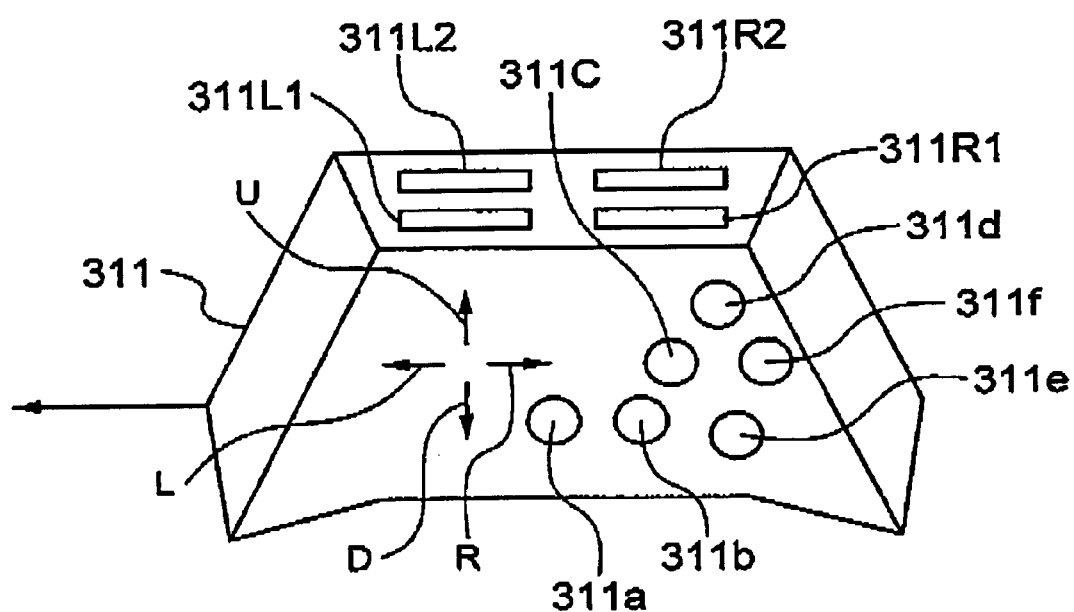
FIG. 9 shows a schematic view for use in describing a controller illustrated in FIG. 8.

Next, with reference to FIG. 9, the controller 311 used in the game apparatus according to the present invention is described in detail. On the upper surface of the controller 311 are deployed or arranged a cross-shaped key composed of a left key L, a right key R, an up key U, and a down key D, a start button 311a, a select button 311b, and first to fourth buttons311c, 311d, 311e, and 311f. The illustrated first to fourth buttons 311c to 311f are marked by the symbols □, Δ, ○, and, X, respectively, and are called □, Δ, ○, and X buttons, respectively.

On the front side surface of the controller 311 are arranged first and second left buttons 311L1 and 311L2, and first and second right buttons 311R1 and 311R2. To these first and second left buttons 311L1 and 311L2 and first and second right buttons 311R1 and 311R2 are assigned functions for each game, such as area settings, cursor movement units, and the like.

Among the above-mentioned keys or buttons, the cross-shaped key is used for sending commands to the CPU 51 to move a character or the like upwards, downwards, inwards, or rightwards. The start button 311a is used to indicate the CPU 51 to start operations based on game program data read out and loaded from the recording medium 84. The select button 311b is for notifying the CPU 51 of various selections relating to the game program, etc., loaded into the main memory 53 from the recording medium 84.

Herein, it often happens that it is necessary to store, into a memory, set data for the game, game results at the end of a game or midway in a game. In this event, the CPU 51 sends the data to the communication control device 91, while the communication control device 91 can store the data from the CPU 51 in a memory card similar to the memory card device 200. The data stored in the memory card device 200 can also be sent to the CPU 51 or may be changed in its data name to another data name. The memory card device 200 or the memory card is separated from the main bus MB, as shown in FIG. 8, and can be detached from the main game machine apparatus 310 with the power source turned on. This structure makes it possible to store the set data into a plurality of memory cards.

Next, description will be made about the card game which relates to the present invention and which is executed by the main game machine unit 310.

The card game executed by the main game machine unit 310 is similar to that executed by the portable game device 11 mentioned in conjunction with FIGS. 1 and 4. Therefore, the card game is progressive between players by alternately locating the card on a predetermined area or arena established on the screen of a display device 65, such as a home television set or receiver. In this example, description will be made about the case where two players have individual controllers 11 and are connected in common to the main game machine unit 10. In this situation, the card game is played between two players. However, one player may play the card game against the computer in a manner similar to the portable game machine 11.

Figure 10:
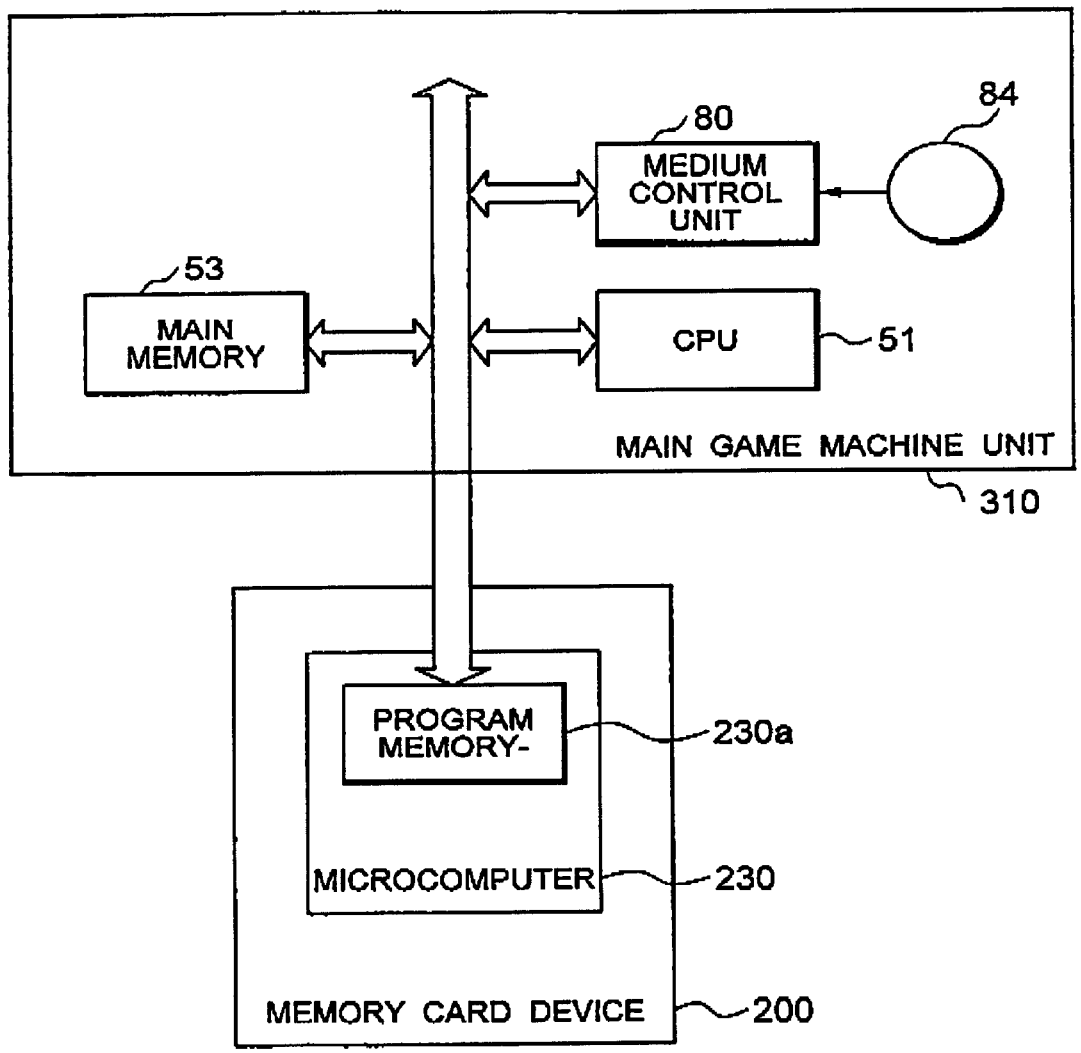
FIG. 10 shows a block diagram for use in describing a connection state between the memory card device and the main game machine unit.
Figure 11:
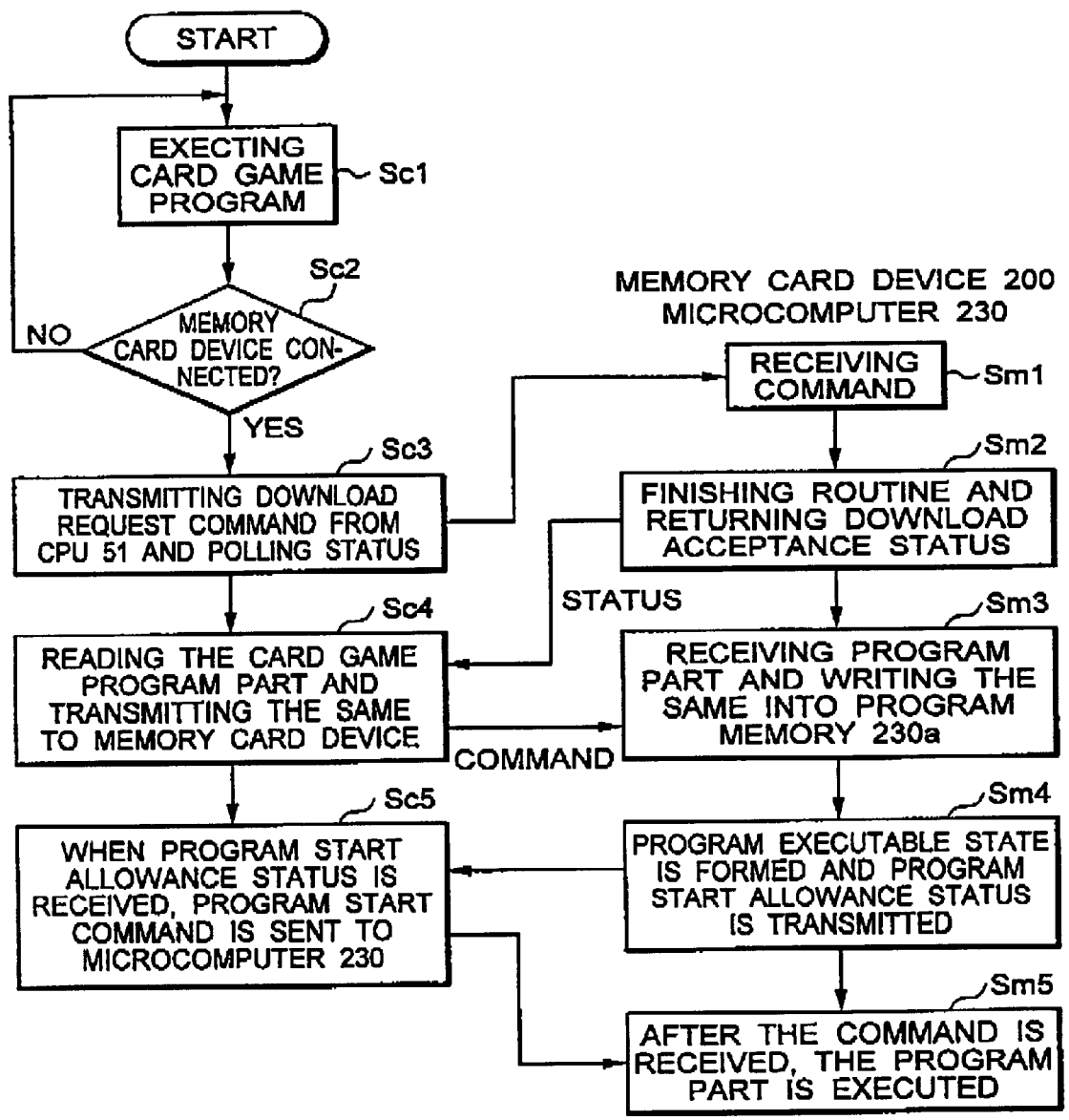
FIG. 11 shows a flowchart for use in describing an operation illustrated in FIG. 10.

Referring to FIGS. 10 and 11, description will be made about a download operation in which a card game program according to the present invention is downloaded from the main game machine unit 310 to the memory card device 200. As shown in FIG. 10, the memory card device 200 is connected to the main bus MB of the main game machine unit 310 when the memory card device 200 is attached to the main game machine unit 310. Under the circumstances, when the recording medium 84 is also attached to the medium control unit 80, a part of the card game program is downloaded into the program memory 230a of the memory card device 200 under control of the CPU 51 of the main game machine unit 310. The card game program part in question is for receiving cards by the use of the infrared ray communication, as will become clear as the description proceeds.

Referring to FIG. 11 in addition to FIG. 10, the download process will be described in detail. The download process for the card game program part is executed under cooperation of the CPU 51 of the main game machine unit 310 and the microprocessor 230 of the memory card device 200. To begin with, the main game machine unit 310 is put into the state of executing the above-mentioned card game program, as shown at a step Sc1 and judges at a step Sc2 whether or not the memory card device 200 is connected to the main game machine unit 310.

When the memory card device 200 is connected to the main game machine unit 310 (step Sc2; No), the step Sc2 is followed by the step Sc1 to continue the card game. On the other hand, when the memory card device 200 is connected to the main game machine unit 310 (step Sc2; Yes), processing proceeds from the step Sc2 to a step Sc3.

At the step Sc3, the CPU 51 of the main game machine unit 310 transmits a program download request command to the microcomputer 230 of the memory card device 200 and executes a polling operation to monitor a response from the microcomputer 230.

When the microcomputer 230 of the memory card device 200 receives the download request command (stem Sm1), the microcomputer 230 finishes a routine which is being executed and returns download acceptance status back to the CPU 51 of the main game machine unit 310 (step Sm2). The download allowance status is indicative of status of accepting to download the card game program part in question.

Responsive to the download acceptance status, the CPU 51 of the main game machine unit 310 reads the card game program part out of the recording medium 84 and transmits the card game program part to the memory card device 200 (step Sc4). Thereafter, the CPU 51 is put in a standby state waiting for a response from the memory card device 200. In the standby state, the CPU 51 carries out the polling operation.

The card game program part (simply called a program part) Is sent to the microprocessor 230 and is written into the program memory 230a (step Sm3). After reception of the program part from the CPU 51, the memory card device 200 is put into an executable state in which the program part can be executed. Thereafter, the microcomputer 230 of the memory card device 200 transmits, to the CPU 51 of the main game machine unit 310, program start allowance representative of the executable state (step Sm4). In this event, the microcomputer 230 monitors a sequence of addresses of the program memory 230a in which the program part is written.

When the program start allowance status is received from the memory card device 200, the CPU 51 transmits a program start command to the microcomputer 230 (step Sc5). Responsive to the program start command, the microcomputer 230 executes the program part when a player gives a start indication (step Sm5). When the program part is executed, the memory card device 200 is usually detached from the main game machine unit 310 and is operable as a portable game device for executing the program part.

In the above-description, it is assumed that the program part in question is directly written into the program memory 230a from the main game machine unit 310. However, the program part may be stored into the non-volatile memory 232 once and thereafter copied into the program memory 230a.

Subsequently, a communication operation between the portable game machine 11 and the memory card device 200 will be described on the assumption that the memory card device 200 is downloaded with the card game program part from the main game machine unit 310 in the above-mentioned manner.

Figure 12:
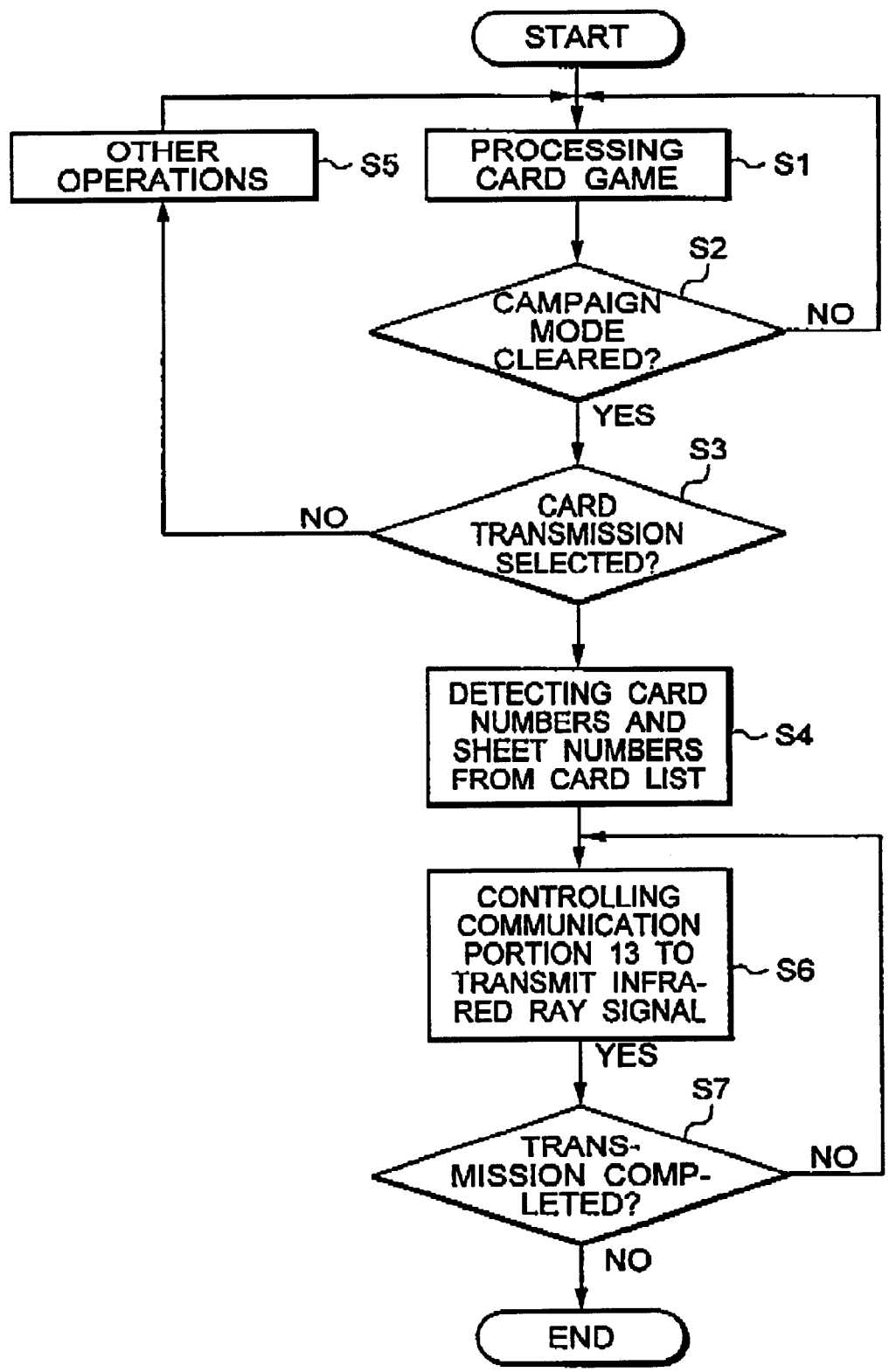
FIG. 12 shows a flowchart for use in describing an operation of the portable game machine carried out when element information is transferred from the portable game machine to the memory card device.

Referring to FIG. 12 along with FIG. 4, the portable game machine 11 according to the present invention executes an infrared ray transmission operation by the use of the infrared ray in a manner to be described below. The infrared ray transmission operation shown in FIG. 12 is executed by the machine-side communication portion 13 under control of the CPU core 26 illustrated in FIG. 4. Specifically, the CPU core 26 executes or processes the card game program in response to the manipulation of a player (step S1). The CPU core 26 judges at a step S2 whether or not the campaign mode is cleared by the player. As long as the campaign mode is not cleared by the player (step S2;No), the card game processing is continued at the step S1.

When the campaign mode is cleared by the player during the card game processing (step S3;Yes), the menu image as shown in FIG. 2 is displayed on the LCD panel 12. When the player selects the card transmission from the menu image (step S3;Yes), the CPU core 26 accesses the RAM 28 (FIG. 4) to detect a card list of the deck stored in the RAM 26. Moreover, the CPU core 26 detects the card numbers and the sheet numbers from the card list of the deck (step S4).

On the other hand, when the player at the step S3 does not select the card transmission, a step S5 follows the step S3 to execute any other operations except the card transmission. Such other operations may include an operation for exchanging cards through a cable, and the like.

Now, let the card numbers and the sheet numbers within the deck be detected at the step S4. In this case, the CPU core 26 controls the machine-side communication portion 13 for the infrared ray communication (step S6) to transmit, from the communication portion 13, an infrared ray signal representative of the card numbers and the sheet numbers. Thus, the infrared ray signal carries the element information which is related to the cards and which is specified by the card numbers and sheet numbers in the illustrated example. At any rate, the infrared ray signal is sequentially generated in accordance with the IrDA standard. The communication portion 13 may produce the infrared ray signal once, twice, or many times.

At a step S7, the CPU core 26 monitors whether or not the infrared ray transmission is finished by the communication portion 13. When the infrared ray transmission is completed (step S7: Yes), the card transmission comes to an end. Otherwise, the CPU core 26 repeats the transmission control of the communication portion 13. However, a maximum transmission time may be determined and the transmission control may be stopped when the infrared ray signal is transmitted the predetermined transmission time.

Figure 13:
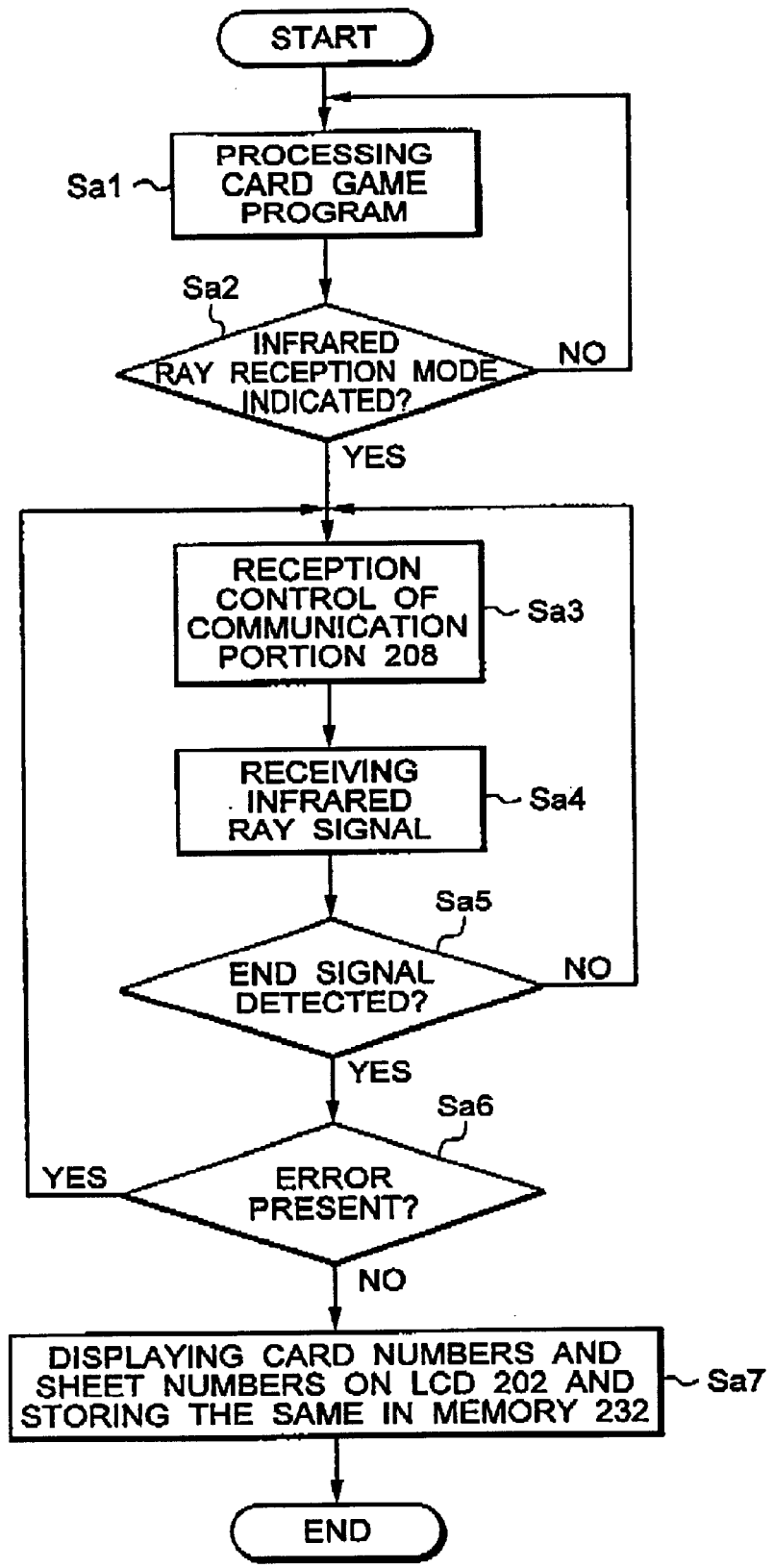
FIG. 13 shows a flowchart for use in describing an operation carried out by the memory card device when the element information is received.
Figure 14:
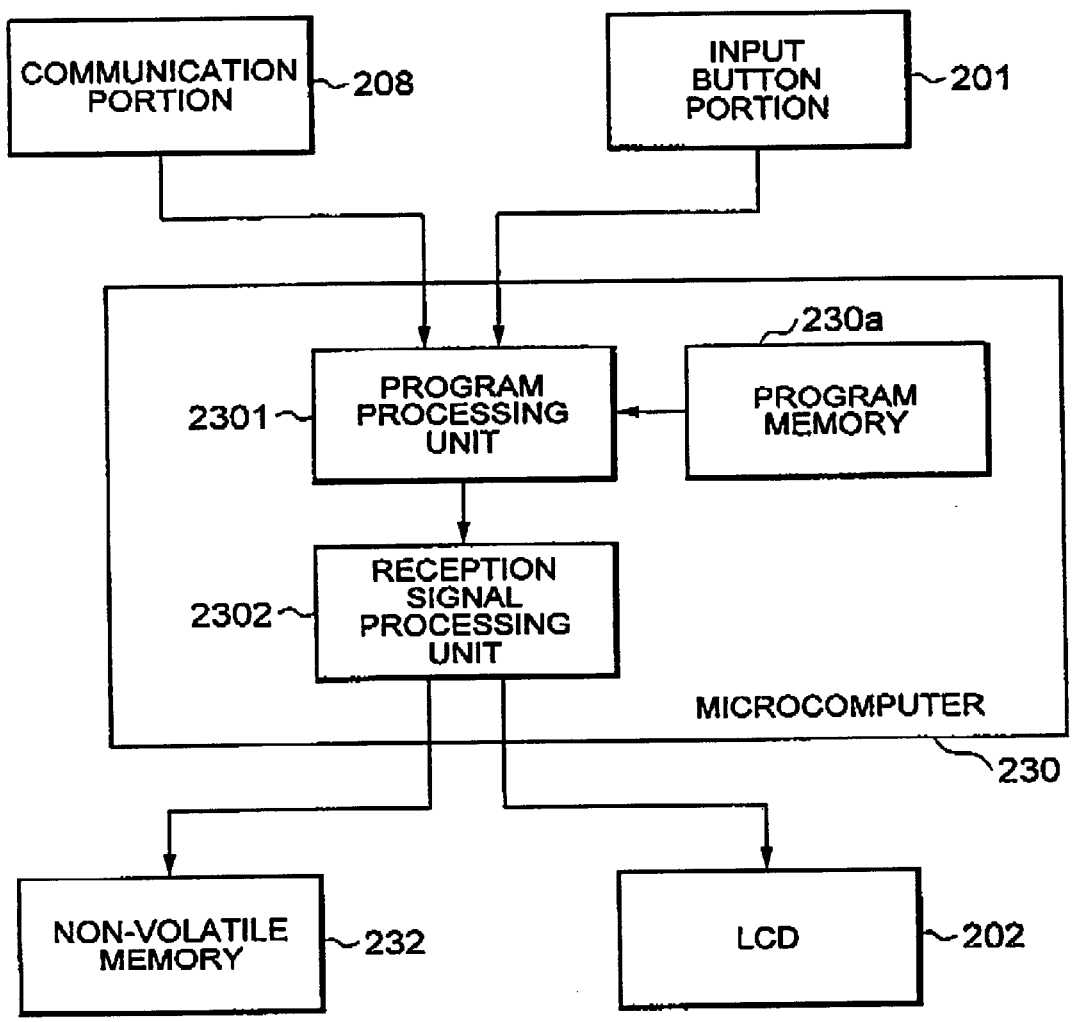
FIG. 14 shows a block diagram for use in describing a microcomputer which is included in the memory card device so as to execute the operation illustrated in FIG. 13. .

Referring to FIGS. 13 and 14, description will be made about a reception operation of the infrared ray signal carried out by the memory card device 200. As shown in FIG. 14, the microcomputer 230 in the memory card device 200 comprises a program processing unit 2301 coupled to the communication portion 208, the input button portion (collectively depicted by 201), and the program memory 230a. The illustrated program processing unit 2301 is assumed to process the card game program mentioned before (as shown at a step Sa1 in FIG. 13).

When the infrared ray reception operation or mode is indicated by the player by manipulating the input button portion 201 (step Sa2; Yes), the program processing unit 2301 controls the communication portion 208 to put the memory card device 200 into a receivable state in which the infrared ray signal can be received (step Sa3). On the other hand, as long as the infrared ray reception mode is not indicated at the step Sa2, the above-mentioned card game program is processed by the program processing unit 2301 (step Sa2;No).

When the communication portion 208 is put into the receivable state at the step Sa3, the communication portion 208 receives the infrared ray signal at a step Sa4 and converts the same into an electric signal. The converted electric signal is sent to a reception signal processing portion 2302.

The above-mentioned reception operation lasts until an end signal carried by the infrared ray signal is detected by the reception signal processing unit 2302. In other words, as long as the end signal is not detected, the reception operation is continued (step Sa5; No).

When the end signal is detected (step Sa5; Yes), the reception signal processing unit 2302 detects at a step Sa6 whether or not an error is included in the converted electric signal. Such error detection is possible by the use of a known technique, such as a parity check technique and/or the like. When any error is present (step Sa6: Yes), the reception operation is repeated again by controlling the communication portion 208 (step Sa3).

When no error is included in the converted electric signal (step Sa6; No), the reception signal processing unit 2302 stores the element information related to the cards into the non-volatile memory 232. In addition, the reception signal processing unit 2302 visually displays, on the LCD 202, the card numbers and the sheet numbers carried as the element information by the infrared ray signal in the manner illustrated in FIG. 3 (step Sa7). Thereafter, the reception operation comes to an end.

The element information (namely, the card numbers and the sheet numbers) of the cards is stored in the non-volatile memory 232 of the memory card device 200 and is thereafter sent to the main game machine unit 310 when the memory card device 200 is attached to the main game machine unit 310. The resultant card numbers and sheet numbers are stored in the main memory 53 of the main game machine unit 310 and are used to form a card deck in the main game machine unit 310. The card deck formed in the main game machine unit 310 is identical with that formed in the portable game machine 11. The main game machine unit 310 converts the card numbers into the corresponding image signals. Thus, card images which correspond to the image signals are visually displayed on the display device 65 connected to the main game machine unit 310.

The card images displayed on the display device 65 is considerably wider than those displayed on the LCD panel 14 of the portable game machine 11 and are easy to see.

As mentioned before, the present invention transfers data, such as element information, except a program among different game devices or machines by using a wireless communication function equipped with the respective game devices or machines. With this structure, a playing environment accomplished by either one of the game devices or machines can be implanted into or transferred to the other type of the game devices or machines. As a result, the other type game device or machine can be played in the same playing environment implanted. This can save time and labor and enhance each player's interest in a game. In addition, inasmuch as the element information alone is transferred, it is possible to reduce an amount of the information to be transferred.

When the present invention is applied to the card game, only the card numbers and sheet numbers may be transmitted through a wireless channel from the portable game machine to the memory card device which can be attached to the main game machine unit. With this structure, cards corresponding to the card numbers can be regenerated in an enlarged size in the main game machine unit by effectively utilizing an image display function of the main game machine unit.

While the present invention has thus far been described in conjunction with a preferred embodiment thereof, it will readily be possible for those skilled in the art to put the present invention into practice in various other manners. For example, the present invention may not be always restricted to the card game but is applicable to any other games than the card game. In this event, any items may be transferred as element information between different game machines or devices.

What is claimed is:

1. A communication method for use in a game system which comprises a memory card device and a portable game machine different in structure from the memory card device;
    the memory card device having a communication function and being attachable to and detachable from a main game machine unit and loaded with a device program related to a predetermined game from the main game machine unit;
    the portable game machine being loaded with a cassette which stores a game program related to the predetermined game and being communicable with the memory card device;
    the method comprising the steps of:
        transmitting, from the portable game machine to the memory card device, element information concerned with elements used in the predetermined game; and
        receiving and visually displaying the element information in the memory card device.

2. A communication method as claimed in claim 1, wherein the predetermined game is specified by a card game played by the use of a plurality of cards while the element information carries card numbers of the cards to identify each card.

3. A communication method as claimed in claim 2, wherein the element information further includes sheet numbers of each card transmitted from the portable game machine to the memory card device.

4. A communication method as claimed in claim 1, wherein the communication between the memory card device and the portable game machine is carried out by the use of an infrared ray.

5. A communication method as claimed in claim 4, wherein each of the portable game machine and the memory card device has the communication function based on the IrDA standard.

6. A communication method as claimed in claim 1, further comprising the steps of:
    transferring the element information from the memory card device to the main game machine unit, when the memory card device is attached to the main game machine unit; and
    executing the predetermined game in the main game machine unit on the basis of the element information transferred from the memory card device.

7. A communication method as claimed in claim 6, wherein the executing step comprises the steps of:

displaying an image corresponding to the element information by the use of the main game machine unit.

8. A communication method as claimed in claim 1, wherein the communication from the portable game machine to the memory card device is carried out when a prescribed condition is fulfilled in the portable game machine.

9. A game system comprising a memory card device attachable to a main game machine unit and a game machine different in structure from the memory card device, the game machine comprising:
    means for displaying, on a display unit of the game machine, a transmission mode for transmitting element information related to elements used in a predetermined game; and
    means for transmitting the element information when the transmission mode is selected; the memory card device comprising:
        means for putting the memory card device into a reception mode for receiving the element information; and
        means for visually displaying the element information in the reception mode in response to the element information.

10. A game system as claimed in claim 9, wherein the predetermined game is specified by a card game played by the use of a plurality of cards identified by card numbers while the element information carries the card numbers to be transmitted.

11. A game system as claimed in claim 9, wherein the element information is transmitted by the use of an infrared ray from the game machine to the memory card device.

12. A game system as claimed in claim 9, wherein the memory card device further comprises:
    means for transferring the element information from the memory card device to the main game machine unit when the memory card device is attached to the main game machine unit.

13. A game system as claimed in claim 9, wherein the game machine is a portable game machine which transmits the element information as an infrared ray signal on the basis of the IrDA standard while the memory card device has the communication function based on the IrDA standard.

14. A game system as claimed in claim 13, wherein the element information carries item numbers used in the game.

15. A game system as claimed in claim 13, wherein the game is a card game using a plurality of cards identified by card numbers;
    the element information carrying the card numbers as the item numbers.

16. A method of carrying out communication to a first game device from a second game device, the first game device having a first memory capacity and a communication function while the second game device has another communication function and a second memory capacity greater then the first memory capacity, each of the first and the second game devices executing a common predetermined card game by using a plurality of cards, the method comprising the steps of:
    selecting, on the second game device, element information which is related to the species of the cards and the card numbers among card information used in the predetermined card game; and
    transmitting, from the second game device to the first game device, the element information without any image information related to the cards:

displaying the element information on the first game device in the form of the species of the cards and the card numbers to identify the transmitted cards.

17. A method as claimed in claim 16, further comprising the steps of:

attaching the first game device to a main game machine unit which has a memory capacity greater than the first memory capacity;

transferring the transmitted species and card numbers from the first game device to the main game machine unit; and visually displaying the image information of the cards corresponding to the element information.

18. A computer-readable recording medium for use in a portable game machine which has a communication function by a wireless signal, the computer-readable recording medium storing a program which executes a game, the program comprising the steps of:

preparing items which are used in the game and which are identified by item numbers assigned to the respective items and item images;

selecting the item numbers alone without the item images; and transmitting element information carrying the selected item numbers.

19. A computer-readable recording medium as claimed in claim 18, wherein the game is specified by a card game which uses a plurality of cards identified by card numbers; the element information carrying the card numbers as the item numbers.

20. A computer-readable recording medium as claimed in claim 19, wherein the element information further includes sheet numbers of each card transmitted from the portable game machine.

21. A computer-readable storage medium for use in a memory card device communicable with the portable game machine which has the computer-readable recording medium claimed in claim 18, the storage medium storing a program which oomprises the steps of:

receiving the element information carrying the item number; and displaying the item number on the memory card device.

22. A computer-readable storage medium as claimed in claim 21, wherein the program further comprises the steps of:

transferring the element information to a main game machine unit when the memory card device; and displaying images corresponding to the element information by the use of the main game machine unit.

23. A game system as claimed in claim 15, wherein the element information also carries sheet numbers of each card.

* * * * *